Feb. 23, 1960     W. J. ROZMUS ET AL     2,926,030
TUBE JOINT STRUCTURE AND METHOD OF MAKING SAME
Filed Aug. 18, 1955
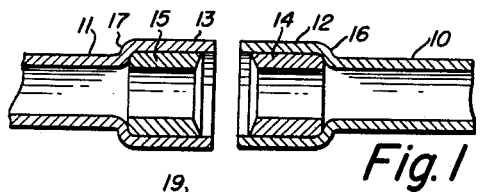
Fig. 1
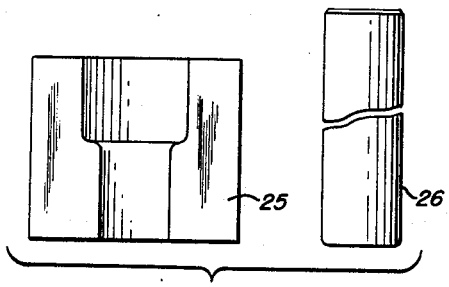
Fig. 4
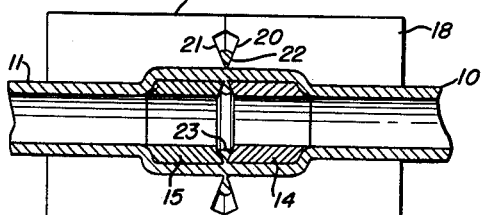
Fig. 2
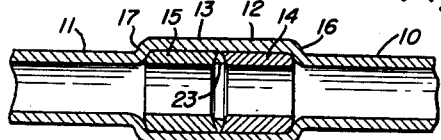
Fig. 3
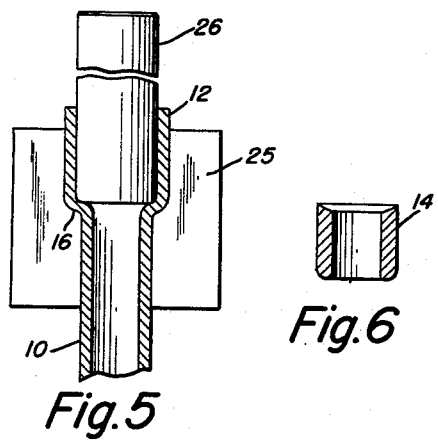
Fig. 5
Fig. 6
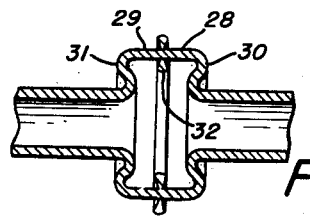
Fig. 8
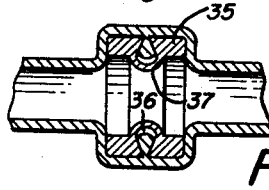
Fig. 9
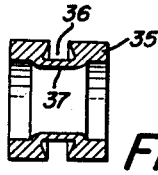
Fig. 10
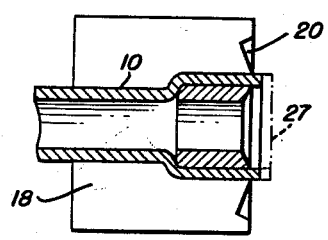
Fig. 7
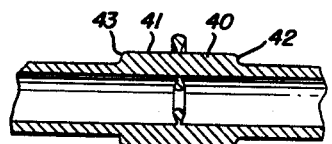
Fig. 11
INVENTOR.
Walter J. Rozmus
William A. Barnes
Mileck T. Rozmus
By: Ray S Pyle
    atty

United States Patent Office 2,926,030
Patented Feb. 23, 1960

2,926,030

TUBE JOINT STRUCTURE AND METHOD OF MAKING SAME

Walter J. Rozmus, Whitesboro, William A. Barnes, Utica, and Mieck T. Rozmus, Whitesboro, N.Y., assignors, by mesne assignments, to Kelsey-Hayes Company, Detroit, Mich., a corporation of Delaware Application August 18, 1955, Serial No. 529,106

4 Claims. (Cl. 285—286)

This invention relates to tube joint structures in general, and relates more specifically to a cold welded tube connector structure of improved physical properties, and to the method to achieve such structure.

The union of two metallic members by the use of controlled flow of the metal structures at temperatures less than conventional heat welding temperature, is a relatively recent accomplishment insofar as reducing the basic principles to a practical and usable procedure is concerned. It has long been known that metal can flow at room temperature under proper conditions of loading. It is possible that the uniting, or welding, of two metal objects by controlled application of high pressure at room temperature has been known. However, the reduction of this knowledge to a practical level has only recently been accomplished.

United States Patent No. 2,522,408 was granted to Sowter for his development in cold pressure welding, and more recently additional Sowter United States Patents Nos. 2,707,821, 2,707,822, 2,707,823, and 2,707,824 have been issued.

Some metals will actually diffuse in such manner that a polished section of the union will not reveal a distinct junction between the two original members. Other metals have a distinct line dividing the original members. It has not definitely been determined what the nature of the union is in this line. It is definitely established, however, that an exceptionally strong union is produced between the two original members whether or not there is an actual diffusion. It is not the concern of the present invention whether or not the union is achieved by actual diffusion or some other phenomena of metal union, but rather with the results obtained and the means to achieve the results. Accordingly, in this specification and in the claims, reference will be made to a union between members caused by controlled flow of the metal structures, or to a cold weld. It is not intended that this invention should be limited by the choice of words to describe the junction between the members.

Although the theoretical background and physical phenomena taking place in the formation of a cold weld joint of this type are not yet fully understood, extensive research and experience indicate that the formation of the cold weld bond is produced by an outwardly moving metal flow between clean interfaces. Simple pressure is not enough. It has now been discovered that the interfaces must be pressed together very intensely over a surface which is not only in movement but which is fixed in contact, and is expanding in area. Although the instructions of the Sowter patents will produce good and acceptable welds, research and testing has led to the discovery of more basic requirements for successful cold pressure welding generally. The metal flow once started must be continuous and severe in nature. Furthermore, the metal of one workpiece must not slide with respect to the mating interface of the other workpiece. For example, a very soft aluminum workpiece would tend to flow over the surface of a harder member such as most copper alloys, rather than flowing with the copper.

Such flow under controlled pressure probably does cause molecular and/or lattice diffusion or interchange between the metals of the two members or to reduce the interface to within molecular dimension, to effect an intimate contact or merging of the two metals into a mechanically strong solid phase welding bond.

In the cold butt welding of rods, wires, and other solid cross-sectional members, a reasonable degree of accuracy in axial alignment of the two members to be welded is required in order to prevent slippage of the members past one another. Such slippage past one another defeats the weld, because of the requirement of keeping the metal in contact under intense and continuing pressure such that the metal flow in the areas of contact are constantly expanding in a common plane to induce molecular mobility and an interlocking of the molecules of the interface.

Welding of such solid cross-sectional members has now become reasonably well controlled and such welding procedure is now commercially acceptable. However, welding of tubular members has heretofore presented a very serious problem because of the difficulty of maintaining the annular tube walls properly aligned throughout the entire cold welding period.

Furthermore, conventional butt welding of tubular members requires both members being joined to be of comparable wall thickness and internal diameter. Accordingly, appreciably different tube sizes cannot be joined by such conventional butt welding.

Therefore, an object of this invention is to provide a tube joint structure having no appreciable internal restriction resulting from the weld.

Another object of this invention is to provide an improved tube end structure adapted for cold weld union without producing an appreciable internal restriction resulting from the weld.

Another object of this invention is to provide improved structural members to enter into and become a part of a cold weld tube joint structure after serving as an internal anvil during the process of cold welding two tubes.

Still another object of this invention is to provide an expendable internal anvil for butt cold welding tubes, which internal anvil becomes a joint reinforcement member after serving its primary function.

Yet another object of this invention is to provide a method of butt welding tubes of variant wall thickness and diameter.

Heretofore aluminum tubing has been difficult to use in high pressure fluid systems because any known means of welding resulted in softening of the material and possibilities of porosity. In cold pressure welding, the metal at the weld interface is actually hardened by cold work. Furthermore, hundreds of test welds and commercial use of cold pressure welding has demonstrated that such a weld is a hermetically tight seal even before it is welded extensively enough to be a satisfactory mechanically strong joint. Previous butt welding of tubing by cold pressure welding has entailed heavy equipment because of high pressures and close alignment necessary and internal arbors which had to be removed after welding. By this invention, reasonably light portable equipment may be used to weld together the tube ends as may be available between components of a fluid system such as a refrigerator or aircraft hydraulic controls, because of simplicity of alignment and no need for removable internal arbors.

Therefore, another object of this invention is to permit the use of thinner walled tubing in refrigeration and other systems. Heretofore, the welding means available has necessitated tube walls of appreciable thickness in order to properly butt weld by electric resistance, arc torch or even cold pressure.

Other objects and a fuller understanding of the invention may be had by referring to the following description and claims, taken in conjunction with the accompanying drawings, in which:

Figure 1 is an illustration in section of two prepared tubes, with internal and separate liner sleeves in flared ends thereof;

Figure 2 is an illustration in section of the two tubes joined and positioned in a pair of mated dies which produced the weld;

Figure 3 is a section through the tubes and the welded joint structure, with the external flash removed and the internal flash remaining;

Figure 4 illustrates a die and anvil capable of producing a flared tube end;

Figure 5 illustrates the production of a flared tube end;

Figure 6 illustrates a liner sleeve for a two-sleeve type of joint structure;

Figure 7 illustrates the insertion of a liner sleeve in a flared tube end, and the placement of the combination into a die member, with the excess flared end, which has been removed, indicated in dotted outline;

Figure 8 is a tube joint structure employing only a flared end with no liner sleeve;

Figure 9 is the flared end type of joint set forth in Figure 8, with the addition of a bridge type sleeve liner;

Figure 10 illustrates the original form of the bridge type sleeve liner prior to being incorporated into a joint; and Figure 11 is a flared and thickened end joint reinforcement.

As may be seen by examination of the Sowter patents referred to above, it has heretofore been common practice to provide a supporting anvil to hold the workpieces being welded. Even with prior tube welding practice there is generally provided an internal arbor which acts as an anvil for support of the tubing. With very small tubing such internal support is not practical. Furthermore, with long lengths of tubing it is quite difficult to provide an anvil because of the problem of removing the anvil after the weld has been completed. According to this invention an internal anvil effect is provided by sleeve liner inserts which serve as an internal die and support the internal diameter of the tubing, and thereafter become an integral part of the joint structure for continued support of the joint.

In Figure 1 two tubes 10 and 11 are provided respectively with flared ends 12 and 13. Shoulders 16 and 17 are thus created between the flared ends of the tubes 10 and 11, respectively.

Two substantially identical sleeve liners 14 and 15 are positioned internally of the flared ends. The liners may be of any suitable metal, but the same or similar metal as the associated tube is preferred in order to eliminate electro potential. The sleeve liners fit closely to the internal diameter of the flared ends and have an internal diameter substantially identical to the internal diameter of the respective tubes. The sleeves therefore abut against the internal radius of the shoulders 16 and 17 respectively.

In Figure 2 split dies 18 and 19 are positioned upon the tubes and the tubes are indicated as having been welded by closing of the dies together. The construction and face formation of the dies 18 and 19 are now well known in principle as employed for the welding of rods and wire. The dies are indicated in rectangular form in the drawings, and therefore may be seated in a suitable carriage device which will close the dies and drive the dies together. Other forms of dies, such, for example, as tapered dies, may be employed as now understood in the cold welding art.

The dies 18 and 19 are provided with die face recesses 20 and 21 respectively to shape and control the formation of a flash 22 wihch is produced on the exterior of the tube during the welding operation. Successful cold welding has been found to be dependent upon an outwardly moving metal flow between clean interfaces. These interfaces must be pressed together very intensely over a surface which is not only in movement but which is fixed in contact and expanding in area. Furthermore, it is desirable that the external flash 22 on welded tubing be removed. Accordingly, the surfaces defining recesses 20 and 21 are designed to substantially abut at the surface of the tubing upon closing of the dies, and thereby substantially pinch off the flash for each manual removal.

As set forth in the definition above, a particular metal flow is required for good welding results. It has been found that restriction of the weld area against the formation of an internal flash is not conducive to the formation of a good weld. However, an internal flash in a tubular conduit is objectionable if the flash restricts the tube to any appreciable degree. This invention provides for accommodation of the internal flash in a manner which will not materially restrict the internal diameter of the tube. First the tube ends are flared in order to position the weld area at a greater diameter than the normal tube diameter. Then restriction of the amount of metal moved in creating the weld will limit the internal flash to a minimum projection. Furthermore, the internal sleeves 14 and 15 converge upon the flash and prevent the formation of an abrupt wall change by reason of the flash.

Because the formation of the weld requires a flow of metal, such metal must be available prior to the welding. In Figure 1 it will be noted that the ends of the tubes project beyond the ends of their respective sleeve liners. As the welding pressure is applied by the dies 18 and 19 this metal beyond the ends of the sleeve liners flows as described to create the weld. According to the provisions of this invention, the sleeve liners 14 and 15 will move along with the tubes 10 and 11 as they are forced together by the dies 18 and 19 in the production of the weld. It will be seen from Figure 1 that the abutting faces of the liners 14 and 15 are shaped substantially identically to the shape of the face recesses 20 and 21 of the dies. Accordingly, the sleeve liners 14 and 15 are in essence internal dies cooperating with the recesses 20 and 21 to support the tube wall in the area of the weld and to aid in the formation of the flash. In Figure 2 the internal flash is indicated by reference character 23, positioned between the substantially abutting ends of the sleeve liners 14 and 15.

Upon completion of the welding of the tubes, the external flash 22 is readily removable by a simple hand tool, such as pliers, and the internal flash 23 remains between the sleeve liners 14 and 15. The finished welded tube joint is illustrated in Figure 3 of the drawings.

Although a flared end may be produced by any one of many methods, the particular flared end was produced by the die and anvil indicated in Figure 4 of the drawings. The die is indicated by reference character 25 and may be either a solid die or a split die held by a holding means. Selection will be made according to the length of the tubing to be flared. The tubing is placed into the shaped bore of the die 25 and a ram or anvil 26 driven into the end of the tubing as indicated in Figure 5. Some types of metal may require heating, spinning, or other types of flaring operation, but the Figures 4 and 5 indicate one acceptable method for softer aluminum and copper alloys.

Figure 6 is a detail illustration of one of the sleeve liners 14 and 15 separate from the tube.

In Figure 7 sleeve liner 14 is illustrated as being positioned in the flared end of tube 10, and the combination of tube and liner positioned in the die 18 which will be employed to drive the tube into its welded condition. An excess end portion 27 is indicated by dotted outline in the Figure 7.

An excess of metal is produced and then trimmed away in order to provide an exact projection of the tube from the face of the die and to produce a clean, fresh surface for welding. Welding depends upon clean surfaces and preferably fresh cut or scratched surfaces. Furthermore, it has been found that the projection of the member to be welded from the face of the welding die must be held to a relatively close degree of tolerance. Neither too much nor too little projection may be tolerated for the production of a sound weld. It has been found that a projection substantially equal to the tube wall thickness is the optimum in the welding of small diameter and thin walled tubing. It is not practical nor feasible to remove the excess portion 27 prior to location of the tube in the welding die because of the possibility of variance from the optimum. Accordingly, trimming and preparation is done after positioning of the tube in the die. Although the exact amount of projection for a particular job is not exactly determinable except by experiment, once the optimum has been determined that optimum is found to be very critical. Accordingly, the trimming and preparation device employed to remove the excess portion 27 is always located with respect to the die face rather than to some third and independent locating device.

Figure 8 illustrates the welding of tubes without an internal arbor, but with the weld area positioned out of the diameter of the tube. The tubes are provided with flared ends 28 and 29 which produce shoulders 30 and 31. The shoulders 30 and 31 serve substantially the same function as the shoulders 16 and 17 of Figure 1. Thus the welding dies are able to force the tubes together without producing an excess radial pressure upon the tubing. The tubes of Figure 1 and Figure 8 have a feature in common of providing shoulders to prevent crushing pressures during the welding operation. If the weld area tends to collapse inwardly, or if the internal flash which is indicated by reference character 32 is large, the final conduit area will not be materially restricted because of the positioning of the weld area outwardly by reason of the flared construction.

The individual sleeve liners 14 and 15, although closely positioned in the final weld and serving to aid in support of the weld area, nevertheless are separate and distinct members with a discontinuity at the exact weld area. The flash 23 is wedged tightly therebetween and aids in providing a rigid effect between the two liners. Nevertheless the two are separate.

In the Figures 9 and 10 of the drawings a one-piece liner insert 35 is set forth. In Figure 10 the liner 35 may be seen to have a recess cavity 36 with a light bridge section 37 bridging between the heavier end liner sections. The liner insert 35 is positioned into the flared ends of two tubes to be welded. As the welding procedure takes place the heavy side sections advance toward one another in substantially the same manner as described in connection with the liners 14 and 15. Thus the tube walls are supported and the side walls of the cavity 36 act as die faces in conjunction with the recess faces of the welding dies. As the internal flash is formed it is encased within the closing recess cavity 36. Thus the bridge 37 is bent into a rounded, smooth surface which presents no objectionable projection into the tube conduit, and furthermore maintains a supporting interconnection between the sleeve liner sections and therefore produces a better joint reinforcement.

Figure 11 illustrates a means for preventing internal collapse of a thin wall tube either with or without internal anvils or support. Thickened tube end areas 40 and 41 are created on the tubes to be joined, and therefore produce abutment shoulders 42 and 43 against which the dies may abut to produce a purely longitudinal driving force without unduly large radial compression forces to hold the tubes. If the tube is sufficiently large, an internal die may be employed. If too small for the use of internal dies, any flash formed on the interior may be later removed by a suitable deburring device.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

We claim:

1. First and second members of tubular form and capable of being pressure welded without the application of heat, said members each having an interior substantially inaccessible after welding and having an end wall lying on a plane substantially normal to the axis of the member, each member extending from the said plane at least to a shoulder, an insert die of tubular form within each member, each die having an exterior surface closely fitted to the interior of the member between said shoulder and plane, said die fitted complementally to said shoulder for receiving drive force applied in a direction along said axis through said shoulder, each die having a die face wall spaced from said plane and sloping inwardly away from said plane, the thickness of the walls of said insert die and the mated member related to one another and to the projection of the member beyond said die face wall in such ratio that upon axial alignment of the members to place the end walls thereof in abutment with the outer surfaces confined by a die complemental in shape and position to the insert die and the application of an exterior closing force in axial direction, the material flashed laterally from said end walls between the die faces in a controlled pressure weld flow is substantially confined between the insert die faces to present a full flow interior surface along the inner walls of said inserts.

2. In the construction as defined in claim 1, said insert dies being separated from one another at all times.

3. In the construction as defined in claim 1, a flexible bridge wall interconnecting between the interior surfaces of the opposed insert dies to enclose the entrapped flash within a sealed chamber against the contact of corrosive fluids.

4. In a method of pressure welding together first and second members of tubular form without the application of heat each member having an interior substantially inaccessible after welding, the steps of forming an end wall on each member lying on a plane substantially normal to the axis of the member, providing an internal shoulder in each member a spaced distance from said end wall, providing an insert die of tubular form for each member, forming on each insert die a die face wall sloping inwardly from the exterior surface thereof, placing the insert dies into the members between the shoulder and plane and with the exterior surface thereof closely fitted to the interior of the member, fitting said die complementally to said shoulder for receiving drive force applied in a direction along said axis through said shoulder, placing each sloping die face wall a spaced distance from said plane, selecting the thickness of the walls of said insert die and the mated members and the projection of the members beyond said die face to achieve a particular relationship, confining the outer surfaces of said members by a die complemental in shape and position to said insert die, placing the members in axial alignment with the end walls thereof in abutment, applying to said outer die member an exterior closing force in an axial direction, said particular relationship resulting in the material of the members to be flashed laterally from said end walls between the die faces by a controlled pressure weld flow and substantially confined interiorly of the members between the insert die faces, and stopping said closing force before said flash extends beyond a full flow interior surface position with respect to the inner walls of the inserts.

(References on following page)

References Cited in the file of this patent

UNITED STATES PATENTS

| Number | Name | Date |
|---|---|---|
| 199,180 | Bricknell | Jan. 15, 1878 |
| 649,473 | Palmer | May 15, 1900 |
| 714,903 | Hinds | Dec. 2, 1902 |
| 1,912,993 | Murray | June 6, 1933 |
| 1,920,449 | Unke | Aug. 1, 1933 |
| 1,990,077 | Kernshaw | Feb. 5, 1935 |
| 2,232,593 | Diescher | Feb. 18, 1941 |
| 2,266,796 | Parker | Dec. 23, 1941 |
| 2,522,408 | Sowter | Sept. 12, 1950 |
| 2,623,148 | Ronay | Dec. 23, 1952 |
| 2,643,517 | Lindow | June 16, 1953 |
| 2,707,823 | Sowter | May 10, 1955 |
| 2,816,211 | Hutchins | Dec. 10, 1957 |

FOREIGN PATENTS

| Number | Country | Date |
|---|---|---|
| 287,005 | Great Britain | Mar. 15, 1928 |
| 858,913 | Germany | Dec. 11, 1952 |
| 162,751 | Australia | May 9, 1955 |

OTHER REFERENCES

Journal, August 1951. (Copy in Div. 14 in 29–470.1.)